United States Patent Office 2,953,210
Patented Sept. 20, 1960

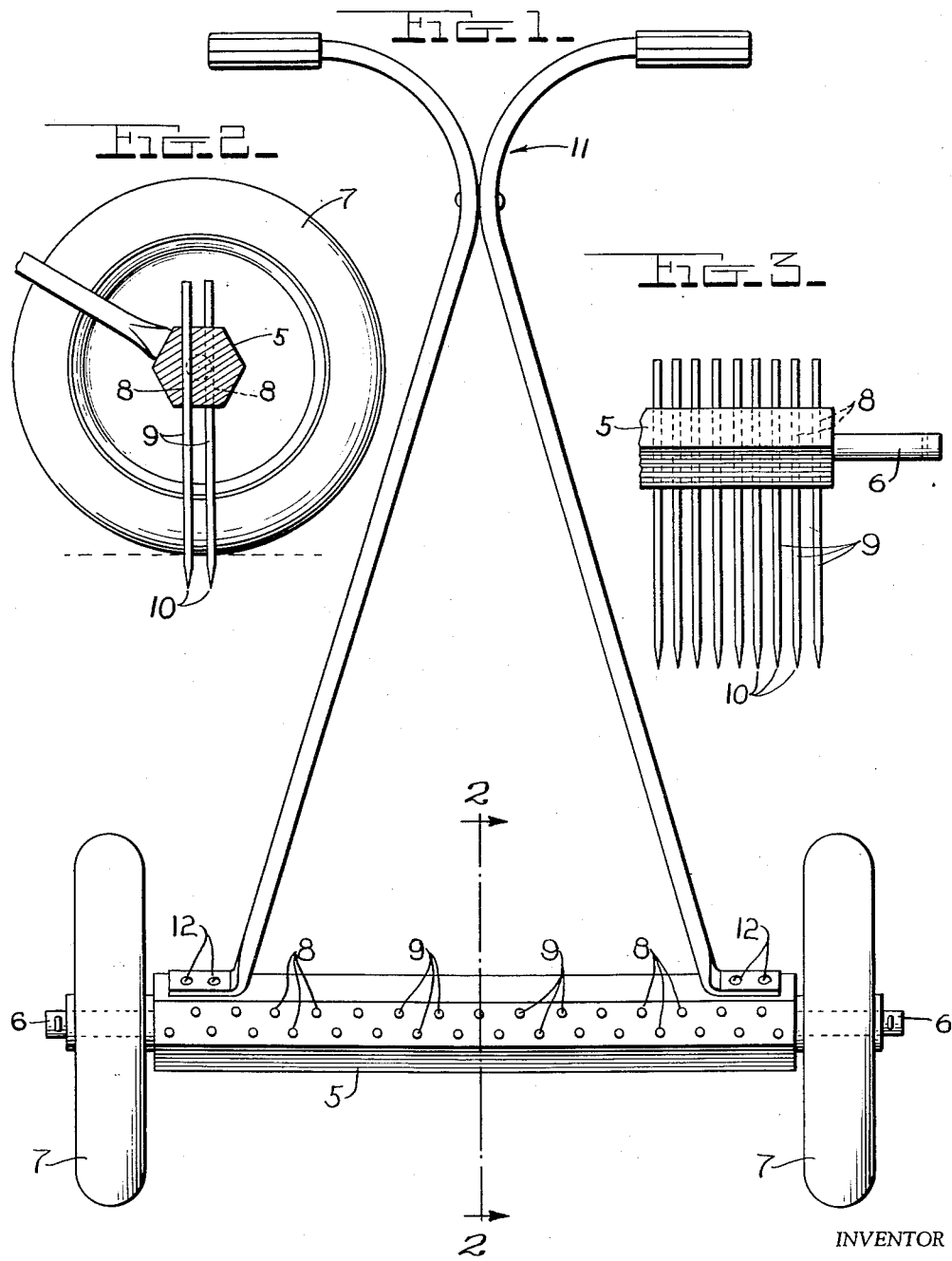

2,953,210

SOIL TILLAGE IMPLEMENT

Clyde A. Bauserman, 120 Waubascon Drive,
Battle Creek, Mich.

Filed Dec. 9, 1957, Ser. No. 701,471

2 Claims. (Cl. 172—354)

The present invention relates broadly to agricultural apparatus, and in its specific phases to a soil tillage implement.

In the working up of seed beds and the loosening of thinly crusted ground surfaces, the common practice is to use coarse toothed drags and finish off with a conventional steel toothed hand rake. This leaves sizeable lumps of soil and a rather rough surface for seeding, instead of a finely pulverized and relatively level surface suitable for seeding, for instance with grass seed, and moreover, after the seed has germinated, such equipment is not suitable for breaking up the thin top soil crust, which forms under standard watering procedures, and retards emergence of the tender grass shoots. It was a recognition of this difficulty and the complete lack of any adequate solution of same which led to the conception and development of the present invention.

Accordingly among the objects of the present invention is the provision of a novel soil tillage implement well adapted for combing and pulverizing soil to prepare a fine soil bed in which to sow or plant, and also well adapted for breaking up and pulverizing any thin surface crust impeding growth, without materially injuring small roots.

In carrying out the above end, a further object is to provide a simple yet effective construction in which a wheeled axle directly carries a series of closely spaced, downwardly projecting tillage teeth, said axle and members attached to same being sufficiently heavy to hold the lower ends of the teeth in the soil, even if the latter be thinly crusted or moderately hard.

Another object is to provide the axle with spaced substantially vertical openings through which the teeth extend and in which they are frictionally held, to permit tooth adjustment, for earth penetration to any desired extent and to compensate for wear.

Yet another object is to form the teeth from lengths of spring steel wire to allow them to vibrate during passage of their lower ends through the soil, thereby shaking the soil and producing better results than if the teeth were heavy and rigid.

A still further object is to provide a novel hand-operated implement in which a suitable push and/or pull handle is secured in conventional manner to the tooth-carrying axle, and holds the axle against rotation with the teeth in upright position.

Still further objects and advantages of this invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but one of various ways in which the principle of the invention may be used.

In the annexed drawing:

Figure 1 is a top view of the soil tillage implement.

Figure 2 is a vertical sectional view as taken on line 2—2 of Figure 1, and looking in the direction of the arrows.

Figure 3 is a fragmentary front or rear elevation showing a portion of the axle, and the teeth carried thereby.

A heavy metal axle 5 is provided with rigid spindles 6 at its ends upon which ground wheels 7 are mounted. The axle 5 may be of any suitable cross-section, such as polygonal and, if desired, its ends may be of suitable reduced size to form the spindles 6. A polygonal shape is desirable to facilitate the drilling of tooth-holding openings 8 through the axle.

The openings 8 are preferably disposed in two rows extending longitudinally of the axle 5, with the openings of both rows equidistantly spaced and the openings of one row staggered with respect to those of the other row.

Vertical tillage teeth 9 are driven through the openings 8 and are preferably frictionally held therein, permitting adjustment of said teeth for soil penetration to any desired extent and also allowing adjustment to compensate for wear.

The teeth 9 are formed from lengths of spring steel wire (preferably of stainless steel approximately 1/8" in diameter for most purposes) and the lower ends 10 of these teeth are tapered to reduce their diameter and permit them to pass between the fine roots of newly seeded grass, if desired, without appreciable damage thereto, while breaking up the thin crust which forms when the watered ground is allowed to dry. These teeth preferably extend a short distance below the plane of the bottom of wheels 7, and a distance of 1/4" to 1/2" is usually very satisfactory.

A suitable push and/or pull handle 11 is provided, and same may be mounted at any desired angle to the teeth 9. The handle shown is similar to a lawn mower handle and is conventionally secured to the axle 5, such as by means of screws 12. This axle is thus held against rotation during use of the implement, and the teeth 9 are maintained in vertical position under normal conditions of use.

As the implement is pushed and/or pulled, after proper setting of the teeth 9, these teeth finely till the soil and break up surface crust and/or small clods. Any small stones may pass through between the teeth 9 without clogging them; and larger stones, which should be removed, are caught in readily accessible position. As the lower ends of the spring teeth pass through the soil, these teeth are free to chatter, or in other words spring back and forth, and thereby impart a vibratory action to the soil which produces better ground pulverizing results than if the teeth were heavy and rigid.

From the foregoing, it will be seen that a novel and advantageous construction has been disclosed for expeditiously attaining the objects of this invention. However, attention is invited to the possibility of making variations without departing from the spirit and scope of the invention as herein shown and described. The directional words such as "vertical," "lower," "below," et cetera, have been used for convenience of describing the soil tillage implement in its usual position of use, and are not to be construed as a limitation of the invention since it can obviously be used on surfaces other than strictly horizontal.

Other modes of applying the principle of my invention may be employed instead of the one explained, change being made as regards the tillage implement herein disclosed, provided the means stated by any of the following claims, or the equivalent of such stated means, be employed.

I therefore particularly point out and distinctly claim as my invention:

1. An operator propelled soil tillage implement for working seed beds and the like comprising a single, elongated, heavy axle, ground wheels journaled on opposite ends of said axle, a first row of longitudinally spaced, co-planar, similar spring-wire tillage teeth depending from said axle between said wheels and terminating beneath the outer periphery of said wheels, a second row of longitudinally spaced co-planar, spring-wire tillage teeth parallel to and similar to said first row of teeth and depending beneath the outer periphery of said wheels the same distance as said first row of teeth, the teeth of said rows being staggered relative to each other, said teeth being vibrationally retained in said axle, and a handle secured to said axle in upwardly extending obtuse angular relation to the plane of said teeth, said teeth extending transversely through and above said axle and being frictionally and extensibly retained therein for adjustment relative to said ground wheels.

2. The structure of claim 1, said axle having a polygonal cross-section, said teeth extending through a pair of opposed faces of said axle, and said handle extending from a face disposed at an angle to the faces through which the teeth extend.

References Cited in the file of this patent

UNITED STATES PATENTS

| | | |
|---|---|---|
| 550,859 | Becker | Dec. 3, 1895 |
| 819,771 | Louge | May 8, 1906 |
| 1,191,610 | Pease | July 18, 1916 |
| 1,839,186 | Leonard | Dec. 29, 1931 |

FOREIGN PATENTS

| | | |
|---|---|---|
| 614,819 | Great Britain | Dec. 23, 1948 |